(12) United States Patent
Kim et al.

(10) Patent No.: US 8,797,464 B2
(45) Date of Patent: Aug. 5, 2014

(54) APPARATUS AND METHOD FOR CONTROLLING HOME NETWORK DEVICES

(75) Inventors: Joo-hyun Kim, Anyang-si (KR); Young-goo Ko, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1251 days.

(21) Appl. No.: 11/601,639

(22) Filed: Nov. 20, 2006

(65) Prior Publication Data

US 2007/0165787 A1 Jul. 19, 2007

(30) Foreign Application Priority Data

Dec. 24, 2005 (KR) .................. 10-2005-0129189

(51) Int. Cl.
*H04N 7/00* (2011.01)
*H04N 5/445* (2011.01)
*H04N 5/268* (2006.01)

(52) U.S. Cl.
USPC ........... 348/734; 348/552; 348/563; 348/705; 348/706

(58) Field of Classification Search
USPC .................. 348/552, 563, 569, 705, 706, 734
See application file for complete search history.

(56) References Cited

U.S. PATENT DOCUMENTS

| | | | | |
|---|---|---|---|---|
| 5,355,149 A | * | 10/1994 | Casebolt ..................... | 345/175 |
| 5,488,427 A | * | 1/1996 | Kayashima et al. .......... | 348/569 |
| 5,565,929 A | * | 10/1996 | Tanaka .......................... | 348/565 |
| 5,646,608 A | * | 7/1997 | Shintani ......................... | 340/3.7 |
| 5,737,440 A | * | 4/1998 | Kunkler ........................ | 382/137 |
| 5,793,361 A | * | 8/1998 | Kahn et al. .................... | 345/179 |
| 5,889,506 A | * | 3/1999 | Lopresti et al. ............... | 345/158 |
| 5,956,025 A | * | 9/1999 | Goulden et al. ............... | 715/716 |
| 6,078,305 A | * | 6/2000 | Mizutani ....................... | 345/629 |
| 6,127,941 A | * | 10/2000 | Van Ryzin ............... | 340/825.69 |
| 6,182,094 B1 | * | 1/2001 | Humpleman et al. ........ | 715/234 |
| 6,243,707 B1 | * | 6/2001 | Humpleman et al. ................ | 1/1 |
| 6,396,544 B1 | * | 5/2002 | Schindler et al. ............. | 348/461 |
| 6,501,515 B1 | * | 12/2002 | Iwamura ....................... | 348/734 |
| 6,593,941 B1 | * | 7/2003 | Sameshima ................... | 715/716 |
| 6,603,488 B2 | * | 8/2003 | Humpleman et al. ........ | 715/771 |
| 6,704,000 B2 | * | 3/2004 | Carpenter ..................... | 345/158 |

(Continued)

FOREIGN PATENT DOCUMENTS

| | | |
|---|---|---|
| JP | 2001-236181 A | 8/2001 |
| JP | 2003-18672 A | 1/2003 |
| JP | 2003-283865 A | 10/2003 |
| WO | 2004047011 A2 | 6/2004 |

OTHER PUBLICATIONS

Hirohiko Mori et al: "Applying Calm Technology for Building Information Space in Everyday Life", SICE 2003 Annual Conference Fukui, Japan, Aug. 4-6, 2003, Piscataway, NJ, IEEE, vol. 2, Aug. 4, 2003, pp. 1942-1947.

*Primary Examiner* — Brian Yenke
(74) *Attorney, Agent, or Firm* — Sughrue Mion, PLLC

(57) ABSTRACT

An apparatus and method for controlling home network devices is provided. The apparatus includes a display unit that displays a list of items corresponding to a plurality controlled devices arranged in a predetermined space, a receiving unit that receives a first image containing the controlled devices, the list, and information on light reflected from a controlled device of the controlled devices and the device list, and a control unit that maps the controlled devices and the items in the list according to the light information detected from the received image.

20 Claims, 10 Drawing Sheets

(56) References Cited

U.S. PATENT DOCUMENTS

| | | | |
|---|---|---|---|
| 6,717,528 B1 * | 4/2004 | Burleson et al. | 340/9.1 |
| 6,791,467 B1 * | 9/2004 | Ben-Ze'ev | 340/825.69 |
| 6,870,555 B2 * | 3/2005 | Sekiguchi | 715/740 |
| 6,967,695 B2 | 11/2005 | Hoshino et al. | |
| 6,976,267 B1 * | 12/2005 | Takano et al. | 725/80 |
| 6,993,134 B1 * | 1/2006 | Epstein | 380/262 |
| 7,337,217 B2 * | 2/2008 | Wang | 709/217 |
| 7,349,967 B2 * | 3/2008 | Wang | 709/227 |
| 7,366,498 B2 * | 4/2008 | Ko et al. | 455/411 |
| 7,607,156 B2 * | 10/2009 | Shintani et al. | 725/80 |
| 7,701,452 B2 * | 4/2010 | Fujiwara | 345/204 |
| 7,728,911 B2 * | 6/2010 | Lacy et al. | 348/706 |
| 7,773,852 B2 * | 8/2010 | Nanba | 386/332 |
| 7,814,441 B2 * | 10/2010 | Bae et al. | 345/420 |
| 7,852,316 B2 * | 12/2010 | Ting | 345/157 |
| 7,880,816 B2 * | 2/2011 | Kinoshita et al. | 348/705 |
| 2001/0030668 A1 | 10/2001 | Erten et al. | |
| 2001/0052946 A1 * | 12/2001 | Sato | 348/706 |
| 2002/0167617 A1 * | 11/2002 | Vornsand | 348/734 |
| 2003/0007104 A1 | 1/2003 | Hoshino et al. | |
| 2003/0011467 A1 * | 1/2003 | Suomela | 340/7.1 |
| 2003/0198382 A1 * | 10/2003 | Chen et al. | 382/173 |
| 2003/0222849 A1 | 12/2003 | Starkweather | |
| 2004/0148632 A1 * | 7/2004 | Park et al. | 725/81 |
| 2004/0201575 A1 * | 10/2004 | Morrison | 345/173 |
| 2005/0154574 A1 * | 7/2005 | Takemura et al. | 703/22 |
| 2005/0177800 A1 * | 8/2005 | Suzuki et al. | 715/823 |
| 2005/0198663 A1 * | 9/2005 | Chaney et al. | 725/38 |
| 2005/0213846 A1 * | 9/2005 | Matsuda et al. | 382/275 |
| 2005/0219245 A1 * | 10/2005 | Tao | 345/424 |
| 2006/0001839 A1 * | 1/2006 | Beardsley et al. | 353/69 |
| 2007/0136768 A1 * | 6/2007 | Kumar | 725/81 |
| 2007/0192813 A1 * | 8/2007 | Kim | 725/100 |
| 2007/0285425 A1 * | 12/2007 | Bae et al. | 345/427 |
| 2009/0300620 A1 * | 12/2009 | Park et al. | 718/100 |

\* cited by examiner

FIG. 4D
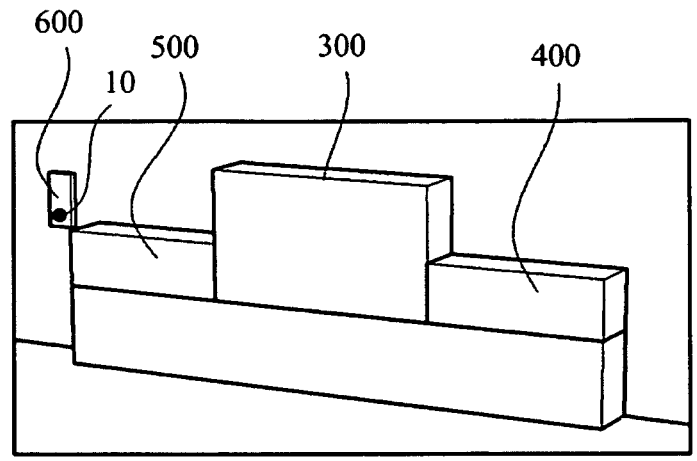
FIG. 4E
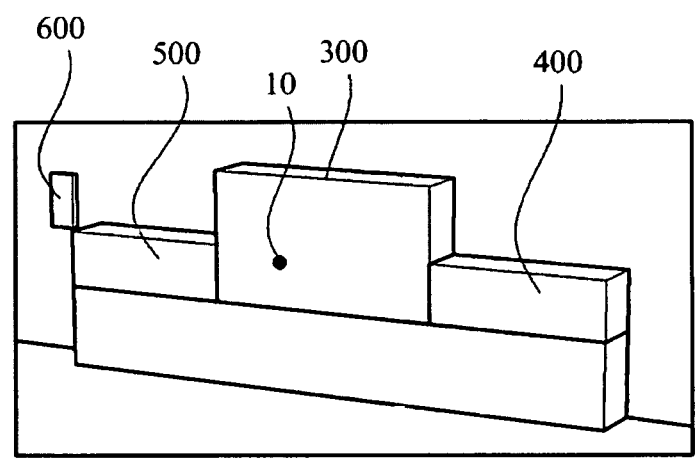
FIG. 5
| AREA | COORDINATE VALUE OF FIRST COORDINATE SYSTEM |
|---|---|
| FIRST AREA | $(X_1, Y_1)$ $(X_2, Y_2)$ $(X_3, Y_3)$ |
| SECOND AREA | $(X_{11}, Y_{11})$ $(X_{12}, Y_{12})$ $(X_{13}, Y_{13})$ |
| THIRD AREA | $(X_{21}, Y_{21})$ $(X_{22}, Y_{22})$ $(X_{23}, Y_{23})$ |
| ⋮ | ⋮ |

FIG. 6

| ID | COORDINATE VALUE OF SECOND COORDINATE SYSTEM |
|---|---|
| Samsung DVD-P | $(x_1, y_1)\ (x_2, y_2)\ (x_3, y_3)\ (x_4, y_4)\ (x_5, y_5)$ |
| Samsung VTR | $(x_{11}, y_{11})\ (x_{12}, y_{12})\ (x_{13}, y_{13})\ (x_{14}, y_{14})\ (x_{15}, y_{15})$ |
| Samsung Switch | $(x_{21}, y_{21})\ (x_{22}, y_{22})\ (x_{23}, y_{23})\ (x_{24}, y_{24})\ (x_{25}, y_{25})$ |
| ⋮ | ⋮ |

41 → ID
42 → COORDINATE VALUE OF SECOND COORDINATE SYSTEM
40

FIG. 7

| ID | COORDINATE VALUE OF FIRST COORDINATE SYSTEM |
|---|---|
| Samsung DVD-P | $(X_1, Y_1)\ (X_2, Y_2)\ (X_3, Y_3)$ |
| Samsung VTR | $(X_{11}, Y_{11})\ (X_{12}, Y_{12})\ (X_{13}, Y_{13})$ |
| Samsung Switch | $(X_{21}, Y_{21})\ (X_{22}, Y_{22})\ (X_{23}, Y_{23})$ |
| ⋮ | ⋮ |

61 → ID
62 → COORDINATE VALUE OF FIRST COORDINATE SYSTEM
60

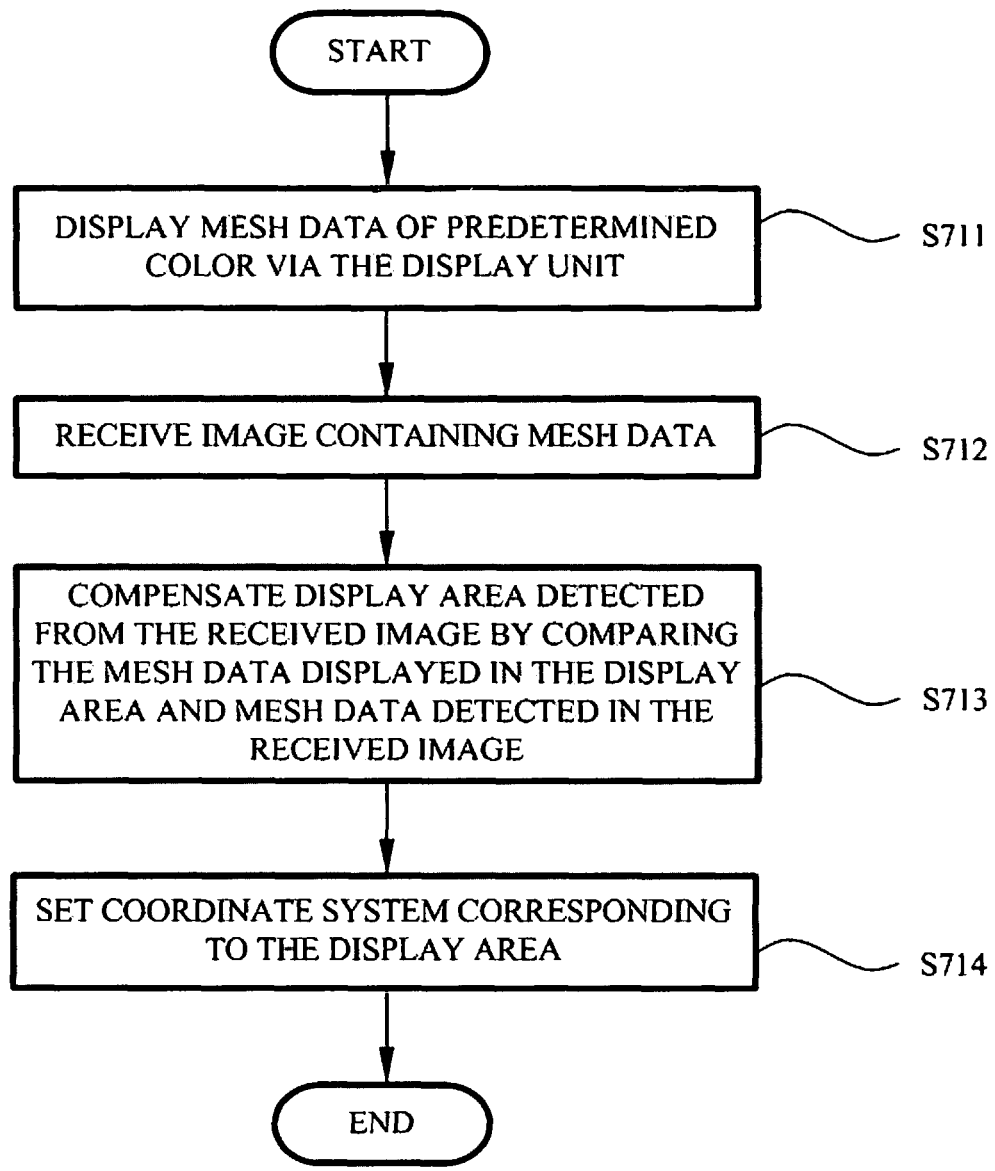

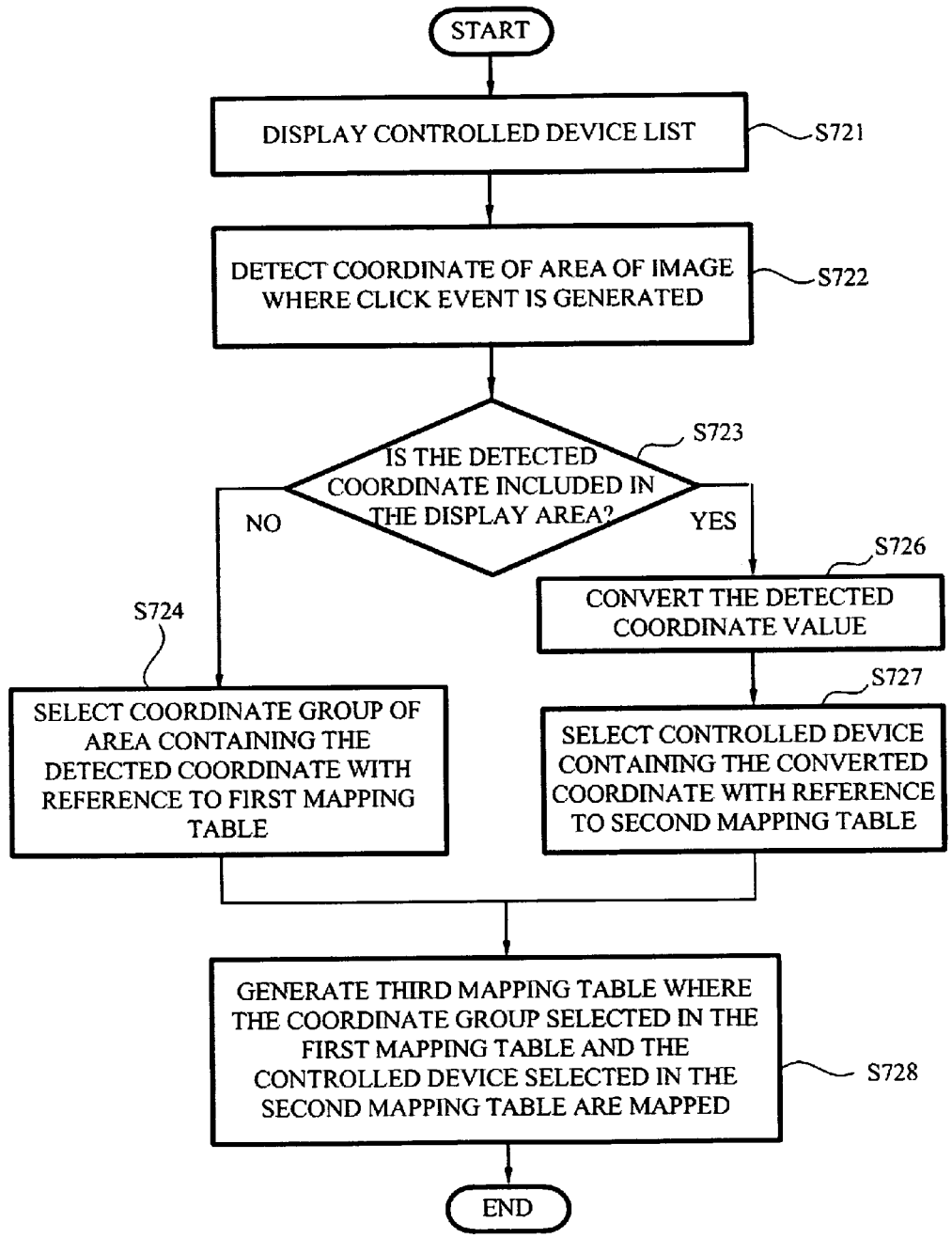

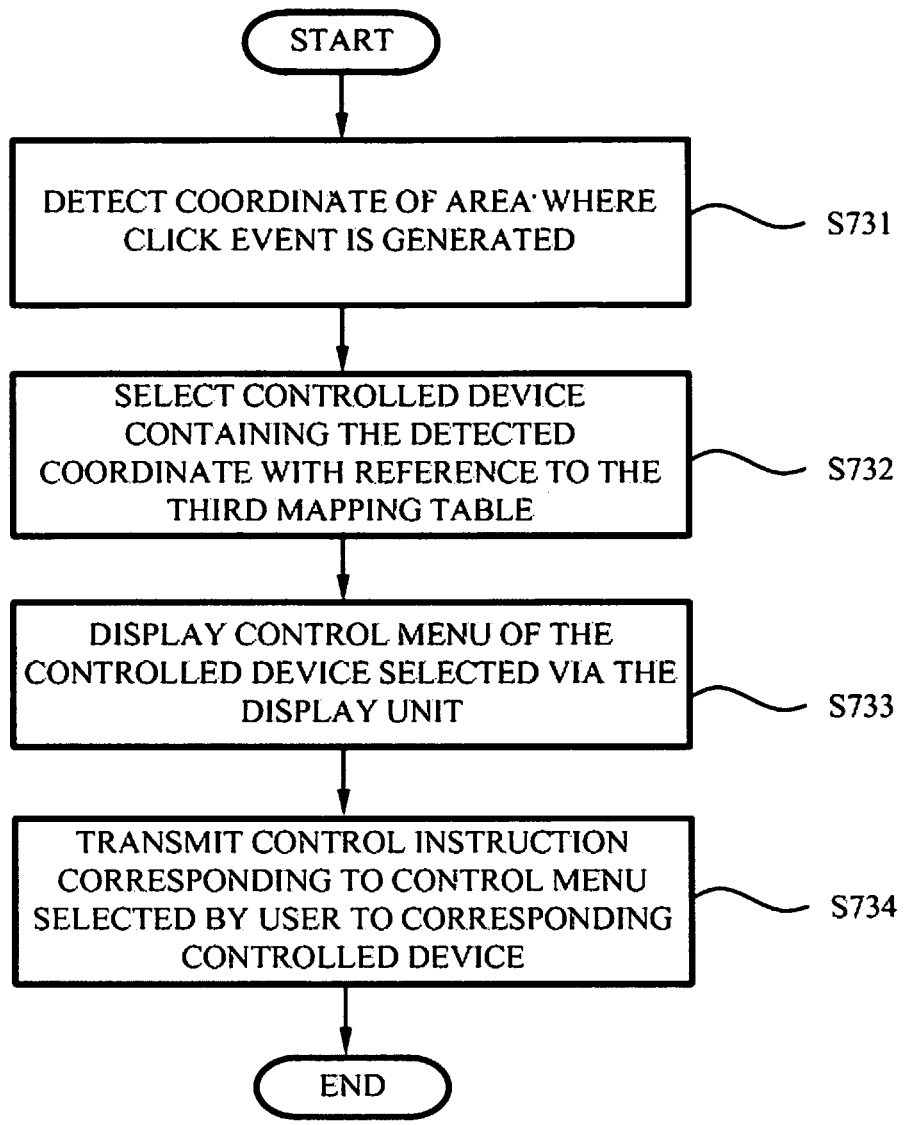

APPARATUS AND METHOD FOR CONTROLLING HOME NETWORK DEVICES

CROSS-REFERENCE TO RELATED APPLICATION

This application is based on and claims priority from Korean Patent Application No. 10-2005-0129189 filed on Dec. 24, 2005 in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to an apparatus and method that can efficiently control devices on a home network.

2. Description of the Related Art

Recently, products aimed at a home network market are being developed, while the use of various in home digital devices is becoming widespread.

A remote controller is usually included with a digital device such as a digital versatile disk (DVD) player, a video cassette recorder (VCR), and a digital television (TV), in order to remotely control a function of the corresponding digital device. However, the remote controller is usually limited to a specific digital device. Accordingly, a user cannot use one remote controller to remotely control a plurality of digital devices.

To solve this problem, an integrated remote controller capable of remotely controlling two or more digital devices has been developed. However, the integrated remote controller also has a problem in that the range of digital devices that can be remotely controlled is limited.

Also, if several taskpads are being operated in a video device such as a digital TV, it is difficult to select a specific taskpad via the conventional remote controller.

Similarly, if a user wants to use a specific digital device on a conventional home network, it is difficult to select a digital device connected to the network. Specifically, in the conventional home network, a list including identification information of a digital device connected to the home network is displayed via a video device such as a digital TV. Then, a user selects a corresponding digital device on the list. However, all digital devices that exist in a home are included in the controlled device list displayed via the video device. If there is a DVD player in every room, a device list including identification information of all DVD players is displayed. Here, if a user wants to use a DVD player located in living room, it is difficult for the user to distinguish from the list which item corresponds to the DVD player in the living room.

Several proposals, for example, Korean Unexamined Patent No. 2002-0047419: "Pointing Device Using Laser and Camera," have been suggested. However, the above-describe problem still remains to be solved.

Accordingly, an apparatus and method that can efficiently control a plurality of digital devices and easily perform an operation in a predetermined video device is needed.

SUMMARY OF THE INVENTION

The present invention provides a user interface using a pointing object in order to easily control a portable broadcast-receiving device.

According to an aspect of the present invention, there is provided an apparatus for controlling home network devices, the apparatus including a display unit that displays a device list on controlled devices arranged in certain spaces, a receiving unit that receives a first image containing the arranged controlled device, the list, and information on light reflected from the arranged controlled devices and the device list, and a control unit that maps the arranged controlled device and a controlled device selected in the list according to the light information detected from the received image.

According to another aspect of the present invention, there is provided an apparatus for controlling home network devices, the apparatus including a receiving unit that receives an image containing a controlled device arranged in a certain space and information on light reflected from the controlled device, a control unit that selects the controlled device, in which the light is reflected, according to the light information detected from the received image, and a display unit that displays a control menu list of selected controlled devices.

According to further aspect of the present invention, there is provided a method of controlling home network devices, the method including displaying a device list on controlled devices arranged in certain spaces, receiving a first image containing the arranged controlled device, the list, and information on light reflected from the arranged controlled device and the list, and mapping the arranged controlled device and a controlled device selected in the list according to the light information detected from the received image.

According to still another aspect of the present invention, there is provided a method of controlling home network devices, the method including receiving an image containing a controlled device arranged in a certain space and information on light reflected from the controlled device, selecting the controlled device, in which the light is reflected, according to the light information detected the received image, and displaying a control menu list of selected controlled devices.

BRIEF DESCRIPTION OF THE DRAWINGS

The above and other aspects of the present invention will become apparent by describing in detail exemplary embodiments thereof with reference to the attached drawings, in which:

FIGS. 4A to 4E depict an image transmitted to the home-network-device-controlling apparatus depicted in FIG. 1;

FIG. 5 illustrates a first mapping table according to an exemplary embodiment of the present invention;

FIG. 6 illustrates a second mapping table according to an exemplary embodiment of the present invention;

FIG. 7 illustrates a third mapping table according to an exemplary embodiment of the present invention;

FIGS. 9 to 11 are flowcharts illustrating in detail operations of the apparatus for controlling a home network device in the method of controlling home network devices depicted in the FIG. 8.

DETAILED DESCRIPTION OF THE EXEMPLARY EMBODIMENTS OF THE INVENTION

Figure 1:
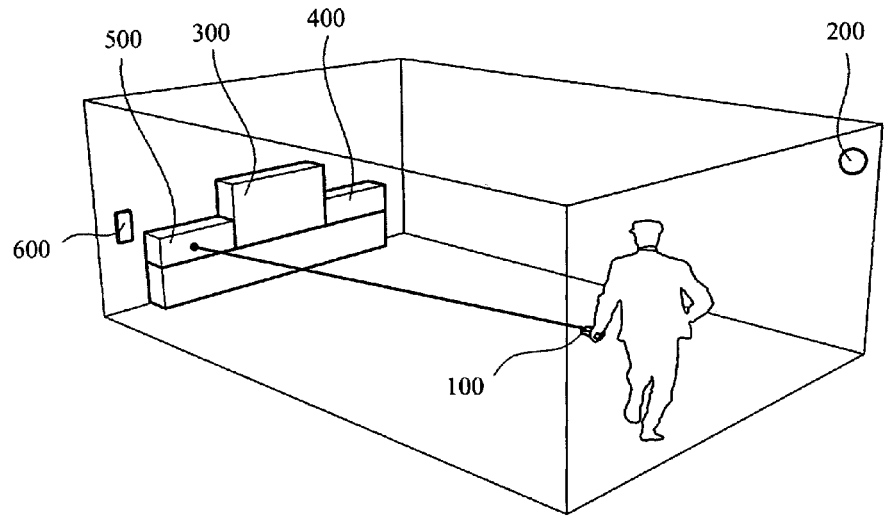
FIG. 1 depicts an apparatus for controlling home network devices according to an exemplary embodiment of the present invention.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to embodiments of the invention. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

First, home network technologies will be briefly described before explaining the present invention.

Home network technologies can be classified into wired and wireless network technologies. The wired network technologies are realized by home phoneline network alliance (PNA), power line control (PLC), Ethernet, IEEE 1394, and universal serial bus (USB). The wireless network technologies are realized by infrared data association (IrDA), IEEE 802.11x wireless local area networks (IEEE 802.11), home radio frequency RF (IEEE 802.15), Bluetooth (IEEE 802.15), ultra wide band (UWB), Zigbee, and hiper local area networks (LANs).

Home PNA is a wired network technology that can enable a home network with a transfer rate of 10 Mbps using a home phone line; thus, alleviating the need for an additional communication line. Home PNA is compatible with IEEE 802.3, Ethernet networks, modems, and integrated services digital networks (ISDNs). Since using higher bandwidth than bandwidth used by phone or other services, home PNA can keep out of jamming on a home phoneline even while the network is used. Home PNA enables all computers on the network to share the Internet even though only one computer is connected to the Internet. Home PNA can be combined with 10 Mbps Ethernet or 56 Kbps modem, and it allows several users to play an Internet game and chat at the same time via one home phone line.

PLC wired networks converts a communication signal into a high frequency in the range of 100 KHz through 30 MHz, and then transmits it. After receiving a communication signal, the PLC network filters it using a high frequency filter.

Ethernet is an LAN technology based on the IEEE 802.3 standard. Ethernet has become widespread it is advantageous in that it, it is safety, and it is cheaper than rival technologies.

FireWire (IEEE 1394) is a serial bus interface technology that enables up to 63 terminals to be connected; it was originally developed to a hard-disk interface. IEEE 1394 is becoming more popular due to the development of digital and multimedia environments. Since IEEE 1394 supports high transfer rates of 100 Mbps, 200 Mbps, and 400 Mbps according to the mode, it can perform high-speed real-time data transfer, two-way communication, and Plug and Play (PnP).

USB has a human interface device (HID) characteristic and sufficient interrupt request (IRQ) resources, enabling to be easily connected peripheral devices, and supporting PnP technology.

However, IEEE 802.11x wireless LAN has emerged as an important wireless home network technology as it does not need wiring, can quickly establish an LAN, and can easily change a net structure. There are several wireless technology standards such as IEEE 802.11b, 802.11a, 802.11g, 802.11e, and 802.11i.

HomeRF has become a standard, and it is based on the shared wireless access protocol (SWAP) 1.1 standard. The goal of HomeRF is to build a home network using RF instead of infrared communication rays.

As a low-power and low-cost short range wireless communication technology that enables communication between several devices in a 10 m range, Bluetooth was limited to an applicable range in the first stage, but currently is a PNA technology used between personal communication devices such as mobile phones and personal digital assistants (PDAs), personal computer (PC) peripheral devices such as headsets, keyboards, speakers and printers, and devices connected to a PC by wire.

UWB was used for special purposes such as military radar and remote-control, but it mainly was released to the public domain by the Federal Communications Commission (FCC) in February 2002. A sample UWB chip set for a wireless moving-image transmission was announced in the first stage. After 2003, it is expected that a 100 Mbps chip will be developed for a wireless moving image transmission in home.

Hereinafter, exemplary embodiments of the present invention will be described in detail with reference to the accompanying drawings.

A home network device controlling system (hereinafter, referred to as a "control system") will be described with reference to FIG. 1.

FIG. 1 depicts an apparatus for controlling home network devices according to an exemplary embodiment of the present invention.

The illustrated control system includes controlled devices 400, 500, and 600, which are arranged in a predetermined space, a laser pointer 100, a video device 300 that controls the controlled devices selected by a user, and a image-capturing device 200 that obtains an image containing information on light reflected from the controlled devices, the video device 300 and the laser pointer 100.

As a home network device, the controlled devices 400, 500 and 600 may be configured to a digital device. The digital device refers to a device having a digital circuit that processes digital data, and may be a computer, a printer, a scanner, a pager, a digital camera, a facsimile machine, a digital copier, a PDA, cellular phone, digital phone, digital projector, digital video recorder, digital camcorder, set-top box, digital refrigerator, microwave oven, electric rice-cooker, air cleaner, portable cell phone, VCR, or DVD player.

The controlled devices are arranged in a predetermined space, and may be connected to the video device via a network, e.g., UPnP, Bluetooth, Home PNA. The controlled devices 400, 500 and 600, which are connected to the video device 300 via the network, provide certain data, e.g., identification information and a control menu of the controlled devices, to the video device 300. The controlled devices receive a control code from the video device 300, and perform an instruction corresponding to the received control code. The control system according to an exemplary embodiment of the present invention includes a first control device 400, a second controlled device 500 and a third controlled devices 600. The first, second and third controlled devices are a DVD player 400, a VCR 500, and a lighting switch 600, which will be described as an example.

The video device 300 is connected to the plurality of controlled devices 400, 500 and 600 via the network, and stores identification and control menu information of the controlled devices and a control instruction for controlling the controlled device. The video device 300 transmits the control instruction for controlling the controlled devices selected by a user via the network. The video device 300 may be configured as a digital device including a display unit such as a digital TV and a computer monitor. The video device 300 is configured as a digital TV, which will be given as an example. A detailed explanation of the video device 300 will be described with reference to FIG. 2.

When a power button (not shown) is pressed, the laser pointer 100 emits a light of a specific wavelength, i.e., a laser. The center of the laser beamspot 100 is white, and the remaining area is red. A user may point to a specific object, e.g., the controlled devices 400, 500 and 600 located in a certain space or the video device 300, using the laser pointer 100, and may visually recognize the area pointed to by the laser pointer 100.

A user may select an item of specific objects, e.g., a controlled device list (refer to reference number 3 of FIG. 3D), displayed on the video device 300. Preferably, but not necessarily, the laser pointer 100 includes a select button (not shown). The select button generates a selection event when pressed by a user. The selection event refers to an event that can select the controlled devices or the video device 300 pointed to by the laser pointer 100; for example, a laser emitted by the laser pointer 100 is turned on and off a certain number of times for a certain amount of time.

The image-capturing device 200 provides an image including information on the laser (refer to reference number 10 of FIG. 3D) reflected by the controlled devices 400, 500 and 600, the video device 300 and the laser pointer 100 to the video device 300. The image-capturing device 200 is set up at a certain space in the home in order for the controlled devices 400, 500 and 600, and the video device 300 to be included within photographic range; for example, it may be set up in a direction facing a wall where the controlled devices and the video device 300 are located, as illustrated in FIG. 1. The image-capturing device 200 is set up as illustrated FIG. 1, which will be described as an example.

Figure 2:
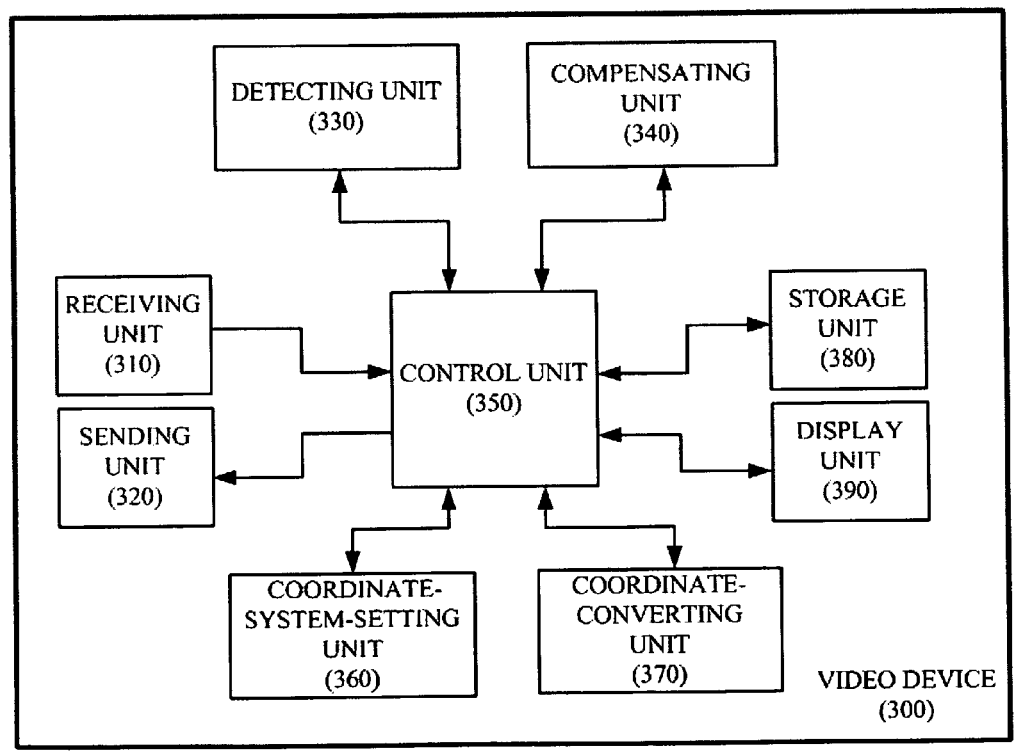
FIG. 2 is a block diagram showing a configuration of the home-network-device-controlling apparatus depicted in FIG. 1.

A video device according to an exemplary embodiment of the present invention will be described with reference to FIGS. 2 through 7. FIG. 2 is a block diagram showing a configuration of a video device according to an exemplary embodiment of the present invention. FIGS. 3A through 3F depict a screen displayed in the video device 300 depicted in FIG. 2. FIGS. 4A through 4E depict an image transmitted to a image-capturing device. FIGS. 5 through 7 illustrate first, second, and third mapping tables according to an exemplary embodiment of the present invention.

The video device 300 illustrated in FIG. 2 includes a transmitting unit 320, a receiving unit 310, a display unit 390, a detecting unit 330, a compensating unit 340, a coordinate-system-setting unit 360, a coordinate-converting unit 370, a storage unit 380, and a control unit 350.

The receiving unit 310 receives identification and control menu information of the controlled devices from the controlled devices. The received identification and control menu information are stored in the following storage unit 380. The receiving unit 310 receives an image via the image-capturing unit 200, and provides it to the compensating unit 340.

The sending unit 320 transmits an instruction for controlling the controlled devices selected by a user to the corresponding controlled devices via a network.

Figure 3A:
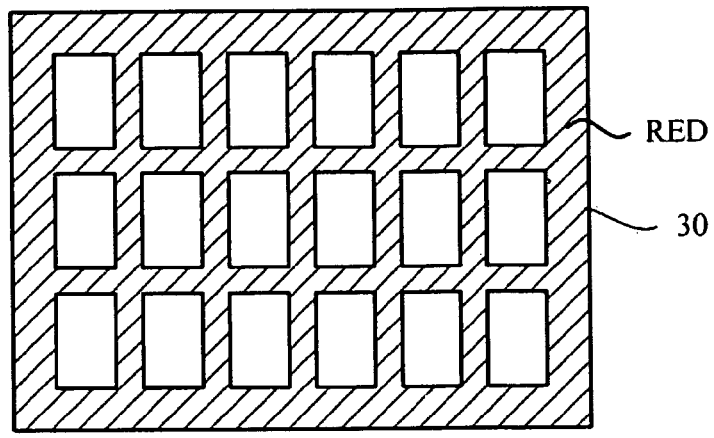
FIGS. 3A to 3F depict a screen displayed in the home-network-device-controlling apparatus depicted in FIG. 1.
Figure 3B:
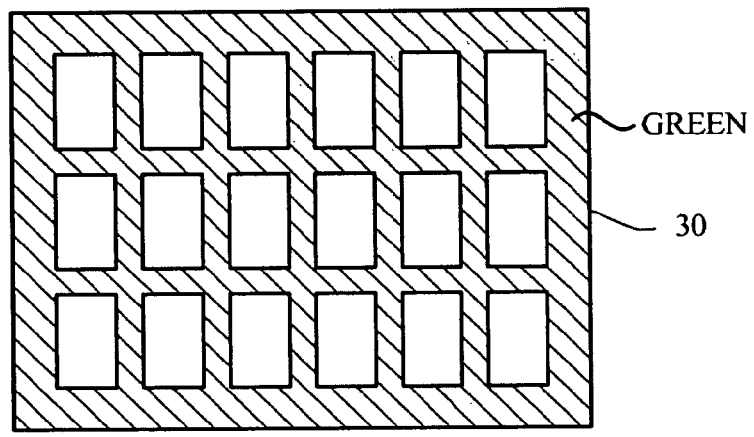
Figure 3C:
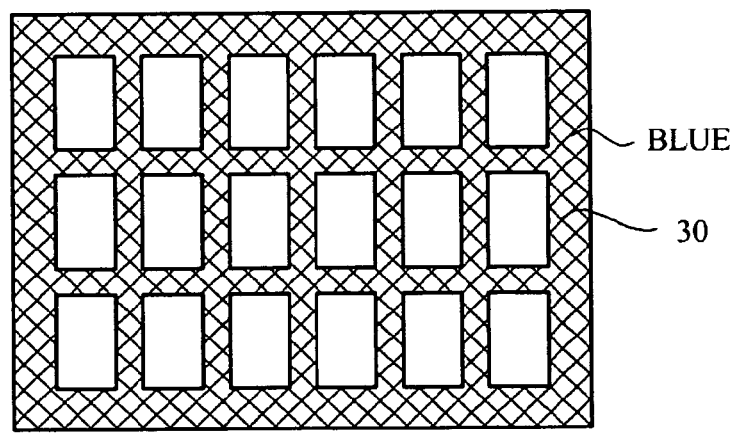

The display unit 390 displays mesh data having a certain color; for example, it displays red, green and blue mesh data, as illustrated in FIGS. 3A through 3C. The display unit 390 enables the detecting unit 330 to detect a display area 30 of the video device 300, of images provided by the image-capturing device 200, and enables the compensating unit 340 to compensate the detected display area 30. The display unit 390 may display data having various patterns other than the mesh data. For example, the display unit 390 may display data having a pattern of circle, triangle, or quadrangle, but is not limited thereto. Colors of the mesh data displayed via the display unit 390 are not limited to red, green, and blue; for example, yellow mesh data may be displayed. Hereinafter, red, green, and blue mesh data is displayed, which is merely exemplary.

Figure 3D:
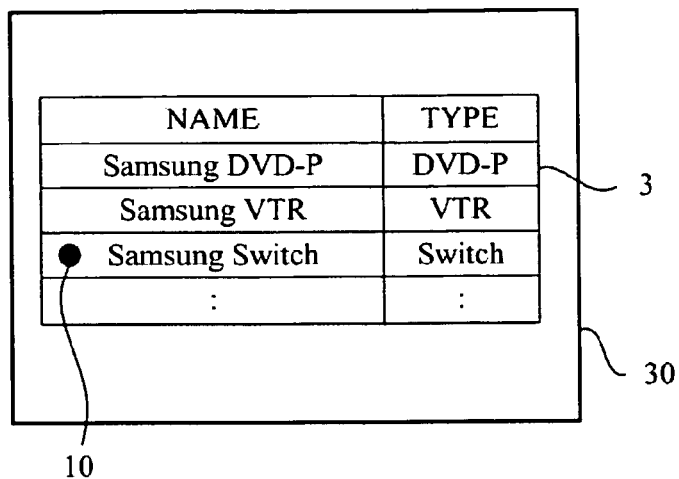

The display unit 390 displays a controlled device list 3 stored in the storage unit 380, as illustrated in FIG. 3D, or a control menu list 4 of the controlled device selected by a user, e.g., a lighting switch 600.

Figure 4A:
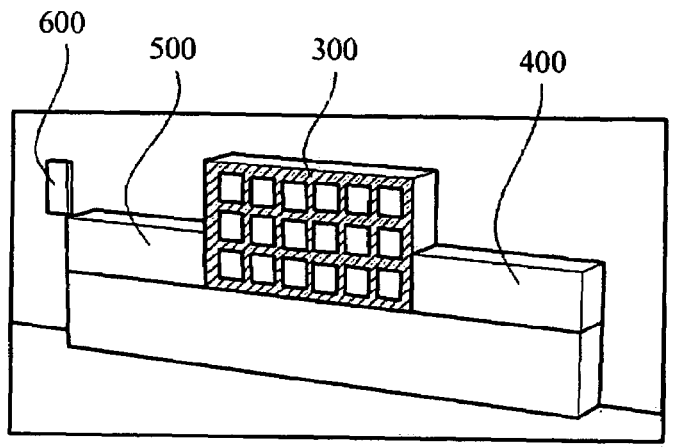
Figure 4B:
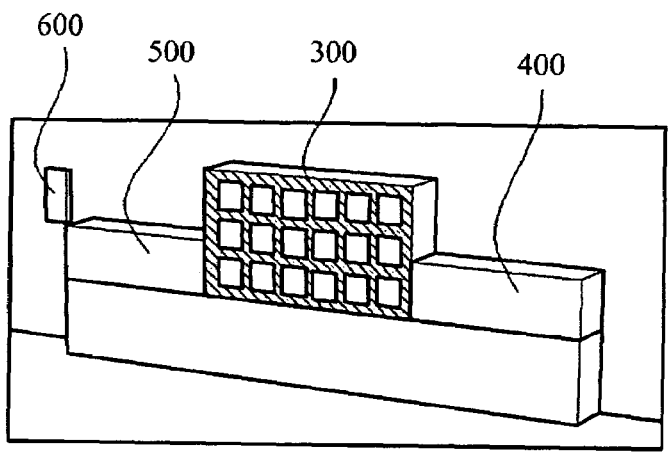
Figure 4C:
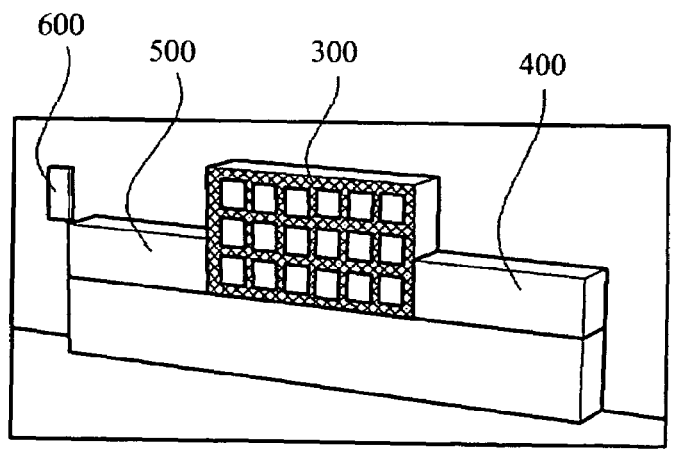

The detecting unit 330 detects the display area 30 of the video device 300 in the image provided by the receiving unit 310. More particularly, when an image including mesh data is successively received, as illustrated in FIGS. 4A through 4C, the detecting unit 330 detects the display unit 30 of the video device 300 by scanning an area in the received image where the pattern exists. Information on the detected display area 30 is provided to the compensating unit 340.

The detecting unit 330 detects areas of the controlled devices 400, 500 and 600 from the image provided by the receiving unit 310. The detecting unit 330 detects the areas of the controlled devices according to a certain algorithm, e.g., an edge detection algorithm, stored in the storage unit 380. When the controlled device areas are detected, the detecting unit 330 detects coordinates included in the detected controlled device areas. Then, the detecting unit 330 provides information on the detected controlled device areas and the coordinates included in the corresponding areas, i.e., coordinate information of a first coordinate system, to the following control unit 350.

The detecting unit 330 detects a coordinate of an area, in which a selection event is generated, from the provided image, and provides coordinate information of the area, in which a selection event is generated, to the following control unit 350.

The compensating unit 340 compensates the display area 30 with reference to mesh data displayed via the display unit 390. More particularly, the compensating unit 340 compares a mesh data pattern displayed via the display unit 390 and a mesh data pattern detected by the detecting unit 330, thereby compensating a display area 30 distorted from the image. A compensation value, e.g., a size value or color compensation ratio, used when the compensating unit 340 compensates the image, is stored in the storage unit 380. The compensating unit 340 may compensate an image provided later using the compensation value stored in the storage unit 380.

The coordinate-system-setting unit 360 sets a first coordinate system for the image received by the receiving unit 310. The coordinate-system-setting unit 360 sets a second coordinate system corresponding to the display area 30 compensated by the compensating unit 340. For example, the coordinate-system-setting unit 360 sets a second coordinate system that has the upper-left vertex of the compensated display area 30 as the origin, and the second coordinate system is stored in the following storage unit 380.

The storage unit 380 stores an algorithm needed to detect the display area 30 from the image provided by the image-capturing device 200 and an algorithm needed to detect the controlled device areas, e.g., the edge-detection algorithm. The storage unit 380 stores the first, second, and third mapping tables 50, 40 and 60 generated by the following control unit 350. The storage unit 380 stores identification information, control menu information, and an instruction code for the corresponding control menu received by the controlled devices 400, 500 and 600. The storage unit 380 also stores information on a compensation value needed to compensate the display area 30 and the second coordinate system set by the coordinate-system-setting unit 360. The storage unit 360 may be, but is not limited to, at least one of a nonvolatile memory device such as a cache, read-only memory (ROM), programmable ROM (PROM), erasable PROM (EPROM), electric EPROM (EEPROM), or a flash memory, a volatile memory device such as random access memory (RAM), or a storage medium such as hard disk drive (HDD).

The control unit 350 generates first, second and third mapping tables 50, 40 and 60. More particularly, the control unit 350 generates the first mapping table 50 illustrated in FIG. 5 by mapping information, e.g., information on the controlled device areas 51 detected from the image and coordinate values 52 of the first coordinate system included in the corresponding areas, provided by the detecting unit 330.

When the control device list 3 is displayed via the display unit 390 after the second coordinate system is set by the coordinate-system-setting unit 360, the control unit 350 generates the second mapping table 40, illustrated in FIG. 6, by mapping items 41 displayed in the display area 30 and coordinate values 42 of the second coordinate system included in the area where each item is displayed.

The control unit 350 generates the third mapping table 60 illustrated in FIG. 7 by mapping coordinate information 62 of the first mapping table 50 and controlled device identification information 61 of the second mapping table 40.

If a selection event is generated when a controlled device is pointed to by the laser pointer 100, the detecting unit 330 detects a coordinate of an area, in which the selection event is generated, i.e., a coordinate of the first coordinate system, and provides it to the control unit 350.

The control unit 350 determines whether the coordinate value provided by the detecting unit 330 is included in the display area 30. If the result shows that the coordinate value provided by the detecting unit 330 is not included in the display area 30, the control unit 350 selects a coordinate group including the coordinate value of the area, in which the selection event is generated, by searching for the first mapping table 50.

If a selection event is generated when a certain item is pointed to in the control device list 3 displayed the display unit 390 by the laser pointer 100, the detecting unit 330 detects a coordinate, i.e., a coordinate of the first coordinate system of an area where the selection event is generated, and then provides it to the control unit 350.

The control unit 350 determines whether the coordinate value provided by the detecting unit 330 is included in the display area 30. If the result shows that the coordinate value provided in the detecting unit 330 is not included in the display area 30, the control unit 350 provides the detected coordinate to the coordinate-converting unit 370.

The coordinate-converting unit 370 converts the coordinate value of the first coordinate system into the coordinate value of the second coordinate system. The converted coordinate value is provided to the control unit 350.

If the converted coordinate value is provided, the control unit 350 selects a controlled device including the converted coordinate value with reference to the second mapping table 40.

Then, the control unit 350 generates the third mapping table 60 illustrated in FIG. 7 by mapping a coordinate group selected in the first mapping table 50 and the controlled device selected in the second mapping table 40.

After the third mapping table 60 is generated as described above, if a selection event is generated when the light emitted by the laser pointer 100 is located on a controlled device, the control unit 350 selects the controlled device including a coordinate of an area where the selection event is generated, with reference to the third mapping table 60. The control unit 350 enables the display unit 390 to display a control menu corresponding to the selected controlled device.

A method of controlling home network devices according to an exemplary embodiment of the present invention will be described with reference to FIGS. 8 through 11.

Figure 8:
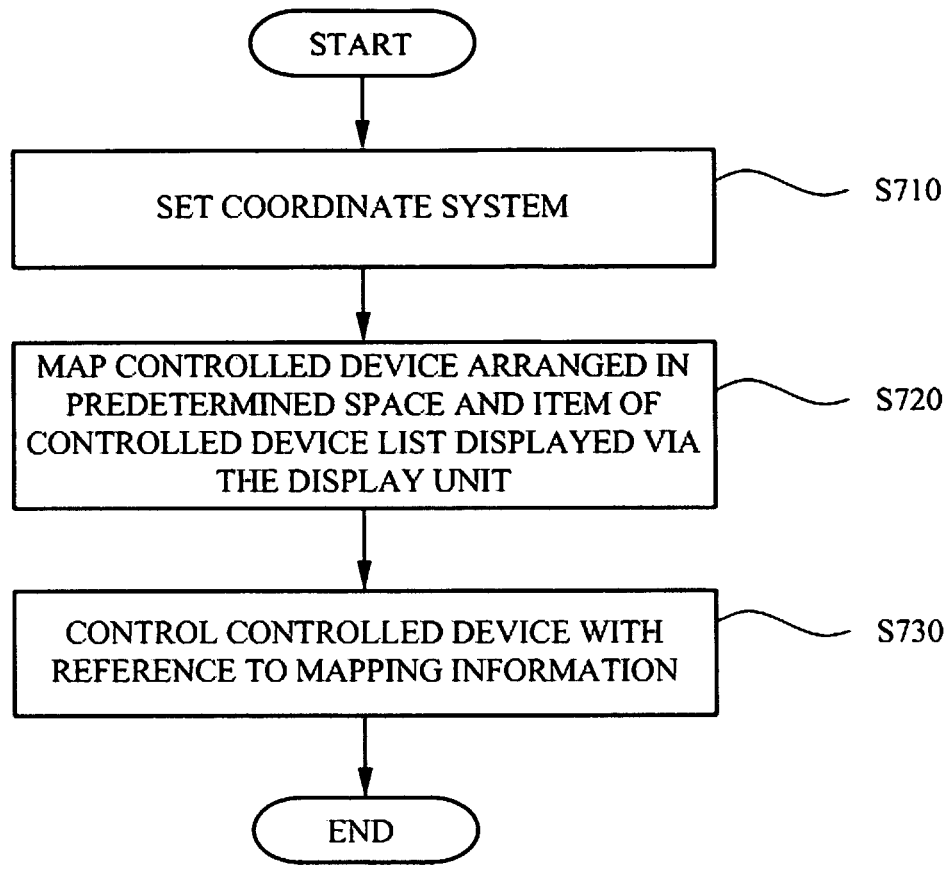
FIG. 8 is a flowchart of a home-network-device-controlling method according to an exemplary embodiment of the present invention.

FIG. 8 is a flowchart of a method of controlling home network devices according to an exemplary embodiment of the present invention. FIGS. 9 to 11 are flowcharts illustrating in detail operations of the apparatus for controlling a home network device of the home network device controlling method depicted in the FIG. 8.

Referring to FIG. 8, the method of controlling home network devices includes setting a coordinate system (S710), mapping a controlled device arranged in a predetermined space and an item corresponding to the controlled device in the controlled device list 3 displayed in the display unit 390 of the video device 300 (S720), and controlling the controlled device.

The setting of a coordinate system (S710) will be described with reference to FIG. 9 in the following.

The control unit 350 of the video device 300 enables the display unit 390 to display a screen having a predetermined pattern (S711). For example, red, green and blue mesh data is successively displayed as illustrated in FIGS. 3A through 3C. If a predetermined color of mesh data is displayed, an image including the video device 300 displaying the mesh data is received via the receiving unit 310 (S712).

Then, the detecting unit 330 detects the display area 30 of the video device 300 in the image received via the receiving unit 310. That is, the detecting unit 330 detects the display area 30 of the video device 300 by detecting a pattern of mesh data.

When the display area 30 of the video device 300 is detected by the detecting unit 330, the compensating unit 340 compares the mesh data pattern displayed via the display unit 390 and the mesh data pattern detected by the detecting unit 330, thereby compensating the display area 30 S713. The compensating unit 340 compensates an image color by comparing a mesh data color displayed via the display unit 390 and a mesh data color detected by the detecting unit 330.

When the image color and the display area 30 is compensated, the coordinate-system-setting unit 360 sets the second coordinate system on the basis of the display area 30 of the video device 300 (S714). For example, the coordinate-system-setting unit 360 sets a coordinate system that has the upper-left vertex of the compensated display area 30 as the origin (FIG. 4A), thus completing coordinate setting for the image.

When the second coordinate system for the compensated display area 30 is set, the control unit 350 generates the first mapping table. More particularly, the detecting unit 330 detects an area of the controlled devices 400, 500 and 600 from the image received via the receiving unit 310. The detecting unit 330 may detect the area using a predetermined algorithm, e.g., an edge detection algorithm. When the area is detected, the detecting unit 330 provides information on the detected area and coordinates included in the corresponding area to the control unit 350.

Then, the control unit 350 generates the first mapping table 50 illustrated in FIG. 5 by creating a table of information on the detected area and coordinates included in the corresponding area. Here, the first mapping table 50 may be changed according to the area where the controlled devices exist. That is, if a new controlled device is located within image-capturing range of the image-capturing device 200, information on an area of the new controlled device is added to the first mapping table 50. However, unless the existing controlled device is located within image-capturing range of the image-capturing device 200, information on the corresponding area is deleted in the first mapping table 50. As described above, generating the first mapping table 50 may be performed before or after setting a coordinate system (S710).

Mapping a controlled device arranged in a predetermined space and an item of the controlled device list 3 displayed in the display unit 390 of the video device 300 (S720) will be described with reference to FIG. 10.

When coordinate setting for the display area 30 is completed, the controlled device 350 of the video device 300 enables the controlled device list 3 to be displayed via the display unit 390 (S721). The controlled device list 3 may include all the controlled devices 400, 500 and 600. That is, a list on all controlled devices 400, 500 and 600 connected to a network may be displayed via the display unit 390 even though new controlled devices are not included within image-capturing range of the image-capturing device 200.

A user selects the controlled devices and the items of the displayed controlled device list 3 using the laser pointer 100.

A user may first select a controlled device 400, 500 or 600 or first select an item of the controlled device list 3 displayed on the video device 300. Hereinafter, the former will be described as an example.

A user points to a controlled device using the laser pointer 100. For example, a user points the lighting switch 600 as illustrated in FIG. 4D. Then, the user presses a select button (not shown) included in the laser pointer 100. When the select button of the laser pointer 100 is pressed, a light emitted by the laser pointer 100 is turned on and off a predetermined number of times for a predetermined amount of time. That is, a selection event is generated.

The detecting unit 330 of the video device 300 detects a coordinate of an area where the selection event is generated, i.e., a coordinate of the first coordinate system, and provides it to the control device 350 (S722).

The control device 350 determines whether the detected coordinate is included in the display area 30 (S723). As a result, when the detect coordinate is not included in the display area 30 ("NO" in S723), the control device 350 searches the first mapping table 50 stored in the storage unit 380. Then, the control device 350 selects a coordinate group including the coordinate in the area where the selection event is generated (S724). If a coordinate of the area where the selection event is generated in FIG. 4D is $(X_{21}, Y_{21})$, the control unit 350 selects a coordinate group corresponding to the third area in the first mapping table 50.

A user points to an item of the controlled device list displayed via the display unit 390 using the laser pointer 100. For example, a user points to a switch item as illustrated in FIG. 3D. Then, a user presses a select button (not shown) included in the laser pointer 100. When the select button of the laser pointer 100 is pressed, a selection event is generated through that a light emitted by the laser pointer 100 which is turned on and off a predetermined number of times for a predetermined amount of time.

The detecting unit 330 of the video device 300 detects a coordinate of an area where the selection event is generated, i.e., a coordinate of the first coordinate system, and provides it to the control device 350 (S722).

The control device 350 determines whether the detected coordinate is included in the display area 30 (S723). As a result, when the detected coordinate is included in the display area 30 ("YES" in S723), the control device 350 provides the detected coordinate to the coordinate-converting unit 370.

The coordinate-converting unit 370 converts the coordinate value provided by the detecting unit 330 into a coordinate value corresponding to the second coordinate system, and then provides it to the control unit 350 (S726).

Then, the control unit 350 selects controlled devices 400, 500 and 600 including the converted coordinate with reference to the second mapping table 40 (S727). If a coordinate value converted by the coordinate-converting unit 370 is $(X_{21}, Y_{21})$, the control unit 350 selects a controlled device including $(X_{21}, Y_{21})$ in the second mapping table 40, i.e., the lighting switch 600.

Then, the control unit 350 maps a coordinate group selected in the first mapping table 50, i.e., a coordinate group corresponding to the third area, and a controlled device selected in the second mapping table 40, i.e., the lighting switch 600 (S728).

A user allows the third mapping table 60 as illustrated in FIG. 7 to be generated by repeating the described steps as many times as the number of the controlled devices photographed by the image-capturing device 300. As a result, mapping of the controlled devices arranged in a space and the items of the controlled device list 3 displayed on the video device 300 is completed.

The controlling of controlled devices (S730) will be described with reference to FIG. 11.

A user points to the controlled devices 400, 500 and 600 using the laser pointer 100, and presses the select button. For example, a user points to the lighting switch 600, and then presses the select button. When the select button is pressed, a light emitted by the laser pointer 100 is turned on and off a predetermined number of times for a predetermined amount of time. That is, a selection event is generated.

The detecting unit 330 of the video device 300 detects a coordinate of an area where the selection event is generated, i.e., a coordinate of the first coordinate system from the image received via the receiving unit 310, and provides it to the control device 350 (S731).

Figure 3E:
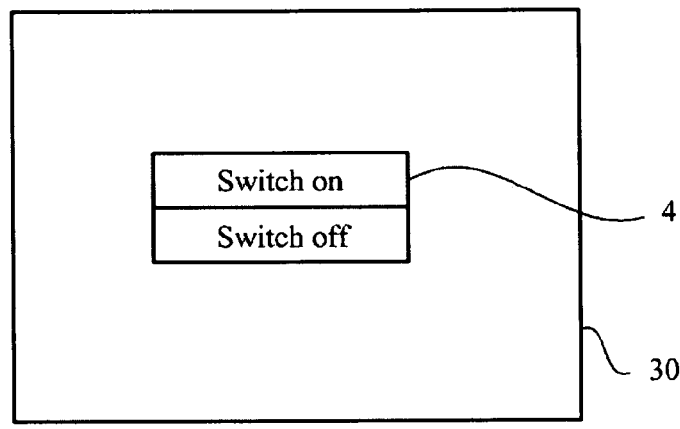

The control device 350 selects the controlled devices 400, 500 and 600 including a coordinate value provided by the detecting unit 330 with reference to the third mapping table 60 (S732). The control device 350 enables the control menu of the selected controlled devices 400, 500 and 600 to be displayed via the display unit 390 (S733). If a coordinate value provided by the detecting unit 330 is ($X_{23}$, $Y_{23}$), the control unit 350 selects the lighting switch 600 in the third mapping table 60. As a result, the control menu list 4 corresponding to the lighting switch is displayed via the display unit 390 as illustrated in FIG. 3E.

Figure 3F:
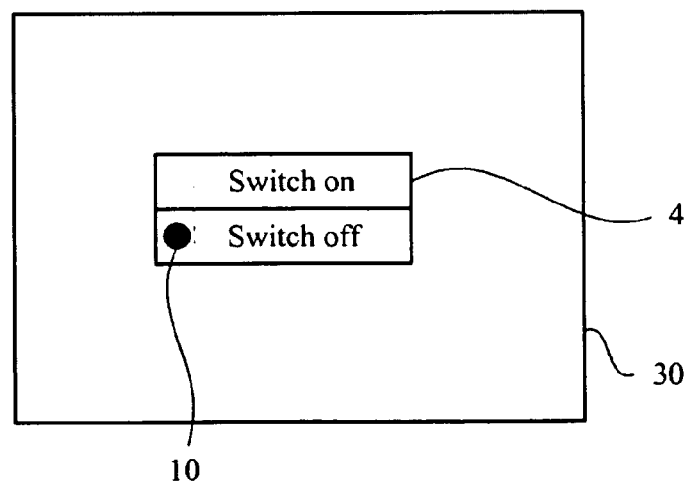

When the control menu list 4 corresponding to the lighting switch 600 is displayed, a user points to a desired menu item using the laser pointer 100, and then selects a pointed menu by pressing the select button. That is, a user generates a selection event. For example, a user points a switch off menu that turns off the lighting, and then generates a selection event by pressing the select button as illustrated in FIG. 3F.

Then, a user presses a select button (not shown) included in the laser pointer 100. When the select button of the laser pointer 100 is pressed, a selection event is generated, through that, a laser released by the laser pointer 100 is turned on and off a predetermined number of times for a predetermined time.

The detecting unit 330 detects a coordinate of an area where the selection event is generated from the received image. Since the detected coordinate is included in the display unit 390, the coordinate is converted into a coordinate value of the second coordinate system by the coordinate-converting unit 370. The converted coordinate value is provided to the control unit 350.

Then, the control unit 350 recognizes a control menu including the converted coordinate value, e.g., a switch off menu, by searching for a table (not shown) including information on a coordinate corresponding to the control menu list 4 of the lighting switch 600. Then, the control unit 350 transmits an instruction corresponding to the recognized control menu, e.g., a switch off instruction via the transmitting unit 320 to the lighting switch 600 with reference to the information stored in the storage unit 380.

As described above, the apparatus for controlling home network devices and method according to the present invention may produce one or more effects described below.

First, a plurality of controlled devices can be easily controlled without a plurality of remote controllers.

Second, since a laser pointer is used, several taskpads displayed in the video device can be easily selected.

Third, information on a position of a controlled device can be provided to a user when a controlled device list is displayed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling home network devices including a user controlled light pointing device, the apparatus comprising:
a display unit that displays on a control device a device list containing items corresponding to a plurality of controlled devices arranged in a predetermined space;
a receiving unit that receives a first image containing the plurality of controlled devices, the device list, and light information on light reflected from a controlled device of the plurality of controlled devices; and
a control unit that maps the controlled device and an item corresponding to the controlled device according to the light information detected from the received first image,
wherein the first image further contains the control device controlling the plurality of controlled devices, and
wherein the display unit displays a mesh pattern having a certain color to correspond to a display area of the display unit,
wherein the receiving unit receives a second image including the mesh pattern,
wherein the control unit detects the display area of the control device by scanning an area in the received second image where the mesh pattern exists, detects areas of the controlled devices in the received second image by using an edge detection algorithm, determines a controlled device pointed by the light pointing device in the detected areas of the controlled devices, and displays a control menu for the determined controlled device on the display unit, and
wherein the apparatus further comprises a compensating unit that compensates a display area of the second image by comparing the mesh pattern displayed on the display area and a mesh pattern detected in the received second image.

2. The apparatus of claim 1, wherein the light information is indicates an occurrence of a selection event that instructs color information to be shown at time intervals.

3. The apparatus of claim 2, wherein the control unit maps the controlled device, in which the selection event is generated, and the item corresponding to the controlled device in the device list.

4. The apparatus of claim 1, further comprising a coordinate-system-setting unit that sets a coordinate system corresponding to the compensated display area.

5. The apparatus of claim 1, wherein the control unit determines whether the light is reflected from a display area of the control device on which the device list is displayed, and determines a coordinate system for mapping, from among a first coordinate system and a second coordinate system, according to the whether the light is determined to be reflected from the display area.

6. An apparatus for controlling home network devices including a user controlled light pointing device, the apparatus comprising:
a receiving unit that receives a first image containing a plurality of controlled devices arranged in a certain space and light information on light reflected from a controlled device of the controlled devices;

a control unit that selects the controlled device, from which the light is reflected, according to the light information detected the received first image; and a display unit that displays on a control device a control menu list of the selected controlled device, wherein the first image further contains the control device controlling the plurality of controlled devices, and wherein the display unit displays a mesh pattern having a certain color corresponding to a display area of the display unit, wherein the receiving unit receives a second image including the mesh pattern, wherein the control unit detects the display area of the control device by scanning an area in the received second image where the mesh pattern exists, detects areas of the controlled devices in the received second image by using an edge detection algorithm, determines a controlled device pointed by the light pointing device in the detected areas of the controlled devices, and displays a control menu for the determined controlled device on the display unit, and wherein the apparatus further comprising a compensating unit that compensates a display area of the second image by comparing the mesh pattern displayed on the display area and a mesh pattern detected in the received second image.

7. The apparatus of claim 6, wherein the light information indicates an occurrence a selection event that instructs color information to be shown at certain time intervals.

8. The apparatus of claim 7, wherein the control unit selects the controlled device in which a selection event is generated.

9. The apparatus of claim 6, further comprising a coordinate-system-setting unit that sets a coordinate system corresponding to the compensated display area.

10. The apparatus of claim 9, wherein the receiving unit receives a second image containing the controlled devices, a device list containing items corresponding to the controlled devices, and the light information on light reflected from the controlled device.

11. The apparatus of claim 10, wherein the control unit maps the controlled device and an item corresponding to the controlled device in the device list according to the light information detected in the second image.

12. A method of controlling home network devices including a user controlled light pointing device, the method comprising:

displaying, on a control device, a device list containing items corresponding to a plurality of controlled devices arranged in a predetermined space;

receiving a first image containing the plurality of controlled devices, the device list, and light information on light reflected from a controlled device of the plurality of controlled devices; and mapping the controlled device and an item corresponding to the controlled device in the device list according to the light information detected in the received first image, wherein the first image further contains the control device controlling the plurality of controlled devices, and wherein the displaying comprises displaying a mesh pattern having a color corresponding to a display area, wherein the method further comprising:

receiving a second image containing the mesh pattern, detecting the display area of the control device by scanning an area in the received second image where the mesh pattern exists, detecting areas of the controlled devices in the received second image by using an edge detection algorithm, determining a controlled device pointed by the light pointing device in the detected areas of the controlled devices, and displaying a control menu for the determined controlled device, and compensating a display area of the second image by comparing the mesh pattern displayed on the display area and a mesh pattern detected from the received second image.

13. The method of claim 12, wherein the light information indicates a selection event that instructs color information to be shown at time intervals.

14. The method of claim 13, wherein the mapping comprises mapping the controlled device, in which a selection event is generated, and the item corresponding to the controlled device.

15. The method of claim 12, further comprising:

setting a coordinate system corresponding to the compensated display area.

16. A method of controlling home network devices including a user controlled light pointing device, the method comprising:

receiving a first image containing a plurality of controlled devices arranged in a predetermined space and light information on light reflected from a controlled device of the controlled devices;

selecting the controlled device, from which the light is reflected, according to the light information detected in the received first image; and displaying, on a control device, a control menu list of the selected controlled device, wherein the first image further contains the control device controlling the plurality of controlled devices, and wherein the displaying comprises displaying a mesh pattern having a color corresponding to a display area, wherein the method further comprising:

receiving a second image containing the mesh pattern, detecting the display area of the control device by scanning an area in the received second image where the mesh pattern exists, detecting areas of the controlled devices in the received second image by using an edge detection algorithm, determining a controlled device pointed by the light pointing device in the detected areas of the controlled devices, and displaying a control menu for the determined controlled device, and compensating a display area of the second image by comparing the mesh pattern displayed on the display area and a mesh pattern detected from the received second image.

17. The method of claim 16, wherein the light information indicates a selection event that instructs color information to be shown at time intervals.

18. The method of claim 17, wherein the selecting comprises selecting an item corresponding to the controlled device, in which a selection event is generated, in a device list containing items corresponding to the plurality of controlled devices.

19. The method of claim 16, further comprising:

setting a coordinate system corresponding to the compensated display area.

20. The method of claim 16, further comprising:

receiving a second image containing the controlled devices, a device list containing items corresponding to the controlled devices, and light information on the light reflected from the controlled device; and mapping the controlled device and an item corresponding to the controlled device in the device list according to the information on the light detected in the second image.

* * * * *